(12) United States Patent
Seely et al.

(10) Patent No.: US 10,713,773 B2
(45) Date of Patent: Jul. 14, 2020

(54) SYSTEM AND METHOD FOR IDENTIFYING A CONDITION OF ROTARY MACHINE COMPONENTS

(71) Applicant: General Electric Company, Schenectady, NY (US)

(72) Inventors: Melissa Ann Seely, Taylors, SC (US); William Forrester Seely, Taylors, SC (US)

(73) Assignee: General Electric Company, Schenectady, NY (US)

( * ) Notice: Subject to any disclaimer, the term of this patent is extended or adjusted under 35 U.S.C. 154(b) by 807 days.

(21) Appl. No.: 14/847,913

(22) Filed: Sep. 8, 2015

(65) Prior Publication Data
US 2017/0069070 A1 Mar. 9, 2017

(51) Int. Cl.
| | |
|---|---|
| H04N 5/232 | (2006.01) |
| G06T 7/00 | (2017.01) |
| F01D 5/12 | (2006.01) |
| F01D 21/00 | (2006.01) |
| F04D 29/32 | (2006.01) |
| F04D 27/00 | (2006.01) |
| H04N 5/225 | (2006.01) |
| H04N 5/32 | (2006.01) |

(52) U.S. Cl.
CPC ............. *G06T 7/001* (2013.01); *F01D 5/12* (2013.01); *F01D 21/003* (2013.01); *F04D 27/001* (2013.01); *F04D 29/324* (2013.01); *G06T 7/0008* (2013.01); *H04N 5/2253* (2013.01); *H04N 5/23296* (2013.01); *F05D 2220/32* (2013.01); *G06T 2207/10116* (2013.01); *G06T 2207/10152* (2013.01); *G06T 2207/30164* (2013.01); *H04N 5/2251* (2013.01); *H04N 5/32* (2013.01)

(58) Field of Classification Search
CPC ............................. G06T 7/001; H04N 5/2253
See application file for complete search history.

(56) References Cited

U.S. PATENT DOCUMENTS

| | | | |
|---|---|---|---|
| 4,803,639 A | | 2/1989 | Steele et al. |
| 6,185,511 B1 | * | 2/2001 | Steffan .................. G06K 9/00 257/E21.525 |
| 6,606,541 B2 | | 8/2003 | Vaidyanathan |
| 6,701,615 B2 | | 3/2004 | Harding et al. |
| 6,915,236 B2 | | 7/2005 | Tanner et al. |
| 8,792,705 B2 | | 7/2014 | Scheid et al. |
| 2004/0183900 A1 | | 9/2004 | Karpen et al. |
| 2009/0089020 A1 | | 4/2009 | Boyer et al. |
| 2010/0141756 A1 | * | 6/2010 | Grote .................... B65C 9/067 348/127 |

(Continued)

*Primary Examiner* — Jonathan R Messmore
(74) *Attorney, Agent, or Firm* — Armstrong Teasdale LLP

(57) ABSTRACT

An imaging and analysis system for a component of a rotary machine includes an image capture device operable to capture image data from at least one selected type of electromagnetic radiation that is at least one of reflected from and transmitted through the component. The system also includes an image processor configured to generate processed data from the captured image data. The system further includes a control system configured to automatically identify a condition of the component by comparing the processed data to stored reference data. The reference data is stored in a format that enables direct comparison to the processed data.

16 Claims, 4 Drawing Sheets

(56) References Cited

U.S. PATENT DOCUMENTS

| | | |
|---|---|---|
| 2010/0280673 A1 | 11/2010 | Woste |
| 2011/0270577 A1 | 11/2011 | Mihok et al. |
| 2011/0298901 A1* | 12/2011 | Derrien .............. G01N 21/9515 348/50 |
| 2013/0114878 A1 | 5/2013 | Scheid et al. |
| 2013/0119256 A1* | 5/2013 | Husmann ............... G01N 27/82 250/341.8 |
| 2015/0168263 A1 | 6/2015 | Mueller et al. |
| 2016/0061591 A1* | 3/2016 | Pangrazio .............. G01B 11/04 382/154 |
| 2016/0309083 A1* | 10/2016 | Smith ................ H04N 5/23229 |

* cited by examiner

SYSTEM AND METHOD FOR IDENTIFYING A CONDITION OF ROTARY MACHINE COMPONENTS

CROSS REFERENCE TO RELATED APPLICATIONS

Cross reference is hereby made to co-pending application Ser. No. 14/847,764 entitled "METHODS AND SYSTEMS FOR DETERMINING CAUSES OF CONDITIONS IN COMPONENTS OF ROTARY MACHINES," filed on Sep. 8, 2015 and having the same inventors as the present application, the disclosure of which is hereby incorporated by reference in its entirety.

BACKGROUND

The field of the disclosure relates generally to rotary machines, and more particularly to identification of a condition, such as wear and/or damage, to components of rotary machines.

Rotary machines typically include components, such as but not limited to rotor blades, that are subject to wear and/or damage during operation of the rotary machine. At least some known systems capture images of such components, such as visible spectrum, x-ray, or other types of images, to facilitate identification and classification of such wear and/or damage, for example by comparison to previously captured images of the components. However, an ability of at least some such systems to consistently identify and classify damage is limited by variations in parameters of the captured images, such as but not limited to variations in position and orientation of the component relative to the imaging device and variations in lighting/illumination conditions. In addition, an ability of at least some such systems to consistently identify and classify damage is limited by a subjectivity of a human analyst of the images. For example, in at least some cases, human analysts can draw different conclusions as to a presence and type of wear and/or damage from a given set of images of a component.

BRIEF DESCRIPTION

In one aspect, an imaging and analysis system for a component of a rotary machine is provided. The system includes an image capture device operable to capture image data from at least one selected type of electromagnetic radiation that is at least one of reflected from and transmitted through the component. The system also includes an image processor configured to generate processed data from the captured image data. The system further includes a control system configured to automatically identify a condition of the component by comparing the processed data to stored reference data. The reference data is stored in a format that enables direct comparison to the processed data.

In another aspect, a method of analyzing a component of a rotary machine is provided. The method includes capturing image data from at least one selected type of electromagnetic radiation that is at least one of reflected from and transmitted through the component. The method also includes generating processed data from the captured image data, and automatically identifying a condition of the component by comparing the processed data to stored reference data. The reference data is stored in a format that enables direct comparison to the processed data.

DETAILED DESCRIPTION

The exemplary components and methods described herein overcome at least some of the disadvantages associated with known systems for identifying wear and/or damage to components of rotary machines. The embodiments described herein provide a computer configured to perform a direct comparison of processed data obtained from images of a component under evaluation with stored reference data to automatically identify the condition of a component. The embodiments described herein also provide a use of reference data associated with an ideal or condition-specific component of the type under evaluation. Certain embodiments also provide a mounting rig configured to selectively present a received component of the rotary machine in at least one preselected position and orientation relative to an image capture device.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
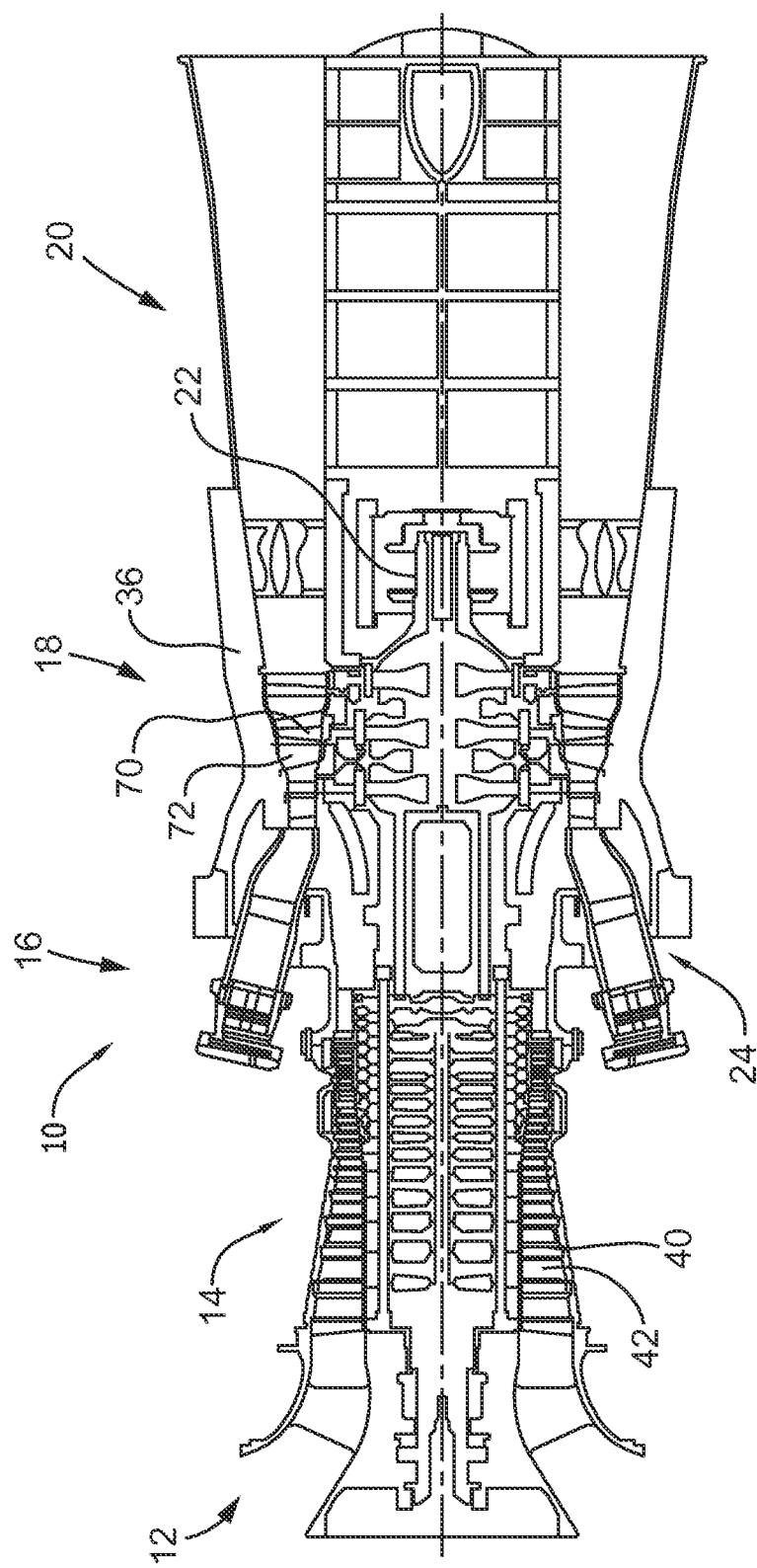
FIG. 1 is a schematic diagram of an exemplary embodiment of a rotary machine.

FIG. 1 is a schematic view of an exemplary rotary machine 10 having components for which embodiments of the imaging and analysis system of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In alternative embodiments, rotary machine 10 is any machine having components that enable the imaging and analysis system of the current disclosure to function as described herein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 40 coupled to rotor shaft 22 within compressor section 14. In the exemplary embodiment, each row of compressor blades 40 is preceded by a circumferential row of compressor stator vanes 42 extending radially inward from casing 36 that direct the air flow into compressor blades 40. The rotational energy of compressor blades 40 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 70 coupled to rotor shaft 22 within turbine section 18. In the exemplary embodiment, each row of rotor blades 70 is preceded by a circumferential row of turbine stator vanes 72 extending radially inward from casing 36 that direct the combustion gases into rotor blades 70. Rotor shaft 22 may be coupled to a load (not shown) such as, but not limited to, an electrical generator and/or a mechanical drive application. The exhausted combustion gases flow downstream from turbine section 18 into exhaust section 20.

Components of rotary machine 10, such as, but not limited to, components of intake section 12, compressor section 14, combustor section 16, turbine section 18, and exhaust section 20 as listed above, are subject to wear and/or damage during operation of rotary machine 10. As just one example, rotor blades 70 and other components of rotary machine 10 in a hot gas path of rotary machine 10 are subject to wear and/or damage from exposure to the high temperature gases. As such, at least some components of rotary machine 10 are removed from rotary machine 10 and examined in an imaging and analysis system 100 to identify wear and/or damage.

Figure 2:
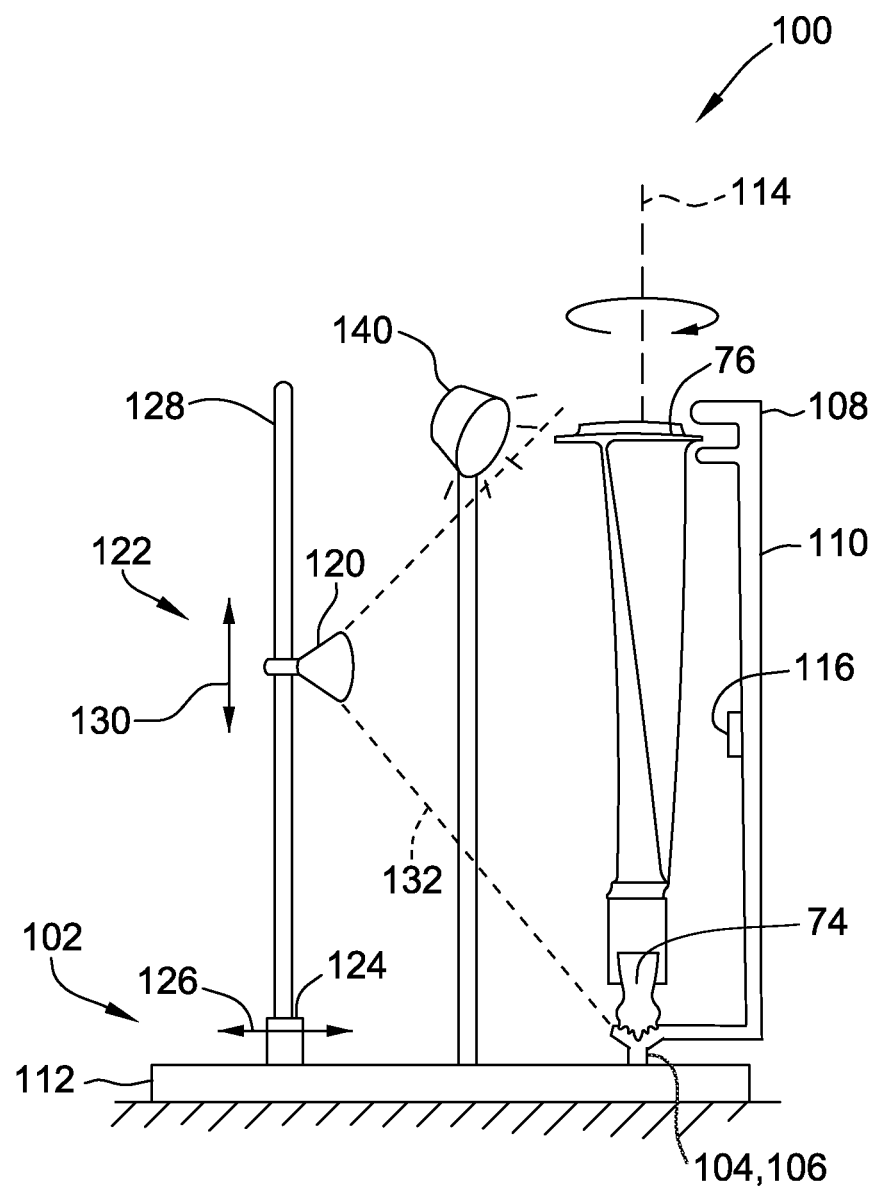
FIG. 2 is a schematic view of an exemplary embodiment of an imaging and analysis system for a component of a rotary machine, such as the rotary machine shown in FIG. 1.

FIG. 2 is a schematic view of an exemplary embodiment of an imaging and analysis system 100 for a component of a rotary machine, such as rotary machine 10. Imaging and analysis system 100 includes a mounting rig 102 configured to receive at least one component of rotary machine 10, and to present the component in at least one preselected position and orientation relative to an image capture device 120. In the illustrated embodiment, mounting rig 102 is configured to receive one of rotor blades 70 of rotary machine 10. In alternative embodiments, mounting rig 102 is configured to receive any suitable component of rotary machine 10.

In certain embodiments, mounting rig 102 includes a component mounting system 104 configured to fixedly receive a respective component of rotary machine 10. For example, in the illustrated embodiment, component mounting system 104 includes a first mounting fixture 106 configured to receive a dovetail 74 of rotor blade 70. In some embodiments, first mounting fixture 106 further includes a suitable releasable locking mechanism (not shown) to facilitate selectively maintaining rotor blade 70 in a stationary position relative to first mounting fixture 106 after dovetail 74 is received in first mounting fixture 106. While rotor blade 70 is illustrated as having a dovetail, it should be understood that, in alternative embodiments, first mounting fixture 106 is suitably configured to receive rotor blades that have any other suitable mechanism for attachment to rotor 22 (shown in FIG. 1).

In some embodiments, component mounting system 104 further includes a second mounting fixture 108 opposite first mounting fixture 106. For example, in the exemplary embodiment, second mounting fixture 108 is coupled to first mounting fixture 106 by an arm 110. Second mounting fixture 108 facilitates rigidly fixing the received component of rotary machine 10 with respect to component mounting system 104. For example, in the illustrated embodiment, rotor blade 70 has a length that results in a flexibility of rotor blade 70, and second mounting fixture 108 includes a clamp configured to couple to a second end 76 of rotor blade 70, opposite dovetail 74, to inhibit flexing or other movement of rotor blade 70. In alternative embodiments, second mounting fixture 108 includes any suitable structure that enables second mounting fixture 108 to function as described herein. In other alternative embodiments, component mounting system 104 does not include second mounting fixture 108.

Additionally or alternatively, component mounting system 104 includes any other suitable structure configured to receive rotor blade 70. Moreover, although component mounting system 104 is illustrated as configured to receive rotor blade 70, in alternative embodiments, component mounting system 104 includes any suitable structure configured to receive any suitable component of rotary machine 10.

In the exemplary embodiment, component mounting system 104 is rotatably coupled to a base 112 of mounting rig 102. More specifically, component mounting system 104 is rotatable to selectively present the received component of rotary machine 10 in each of a plurality of preselected orientations relative to image capture device 120. Thus, component mounting system 104 facilitates obtaining images of the received component of rotary machine 10, for example rotor blade 70, from a plurality of preselected angles. For example, but not by way of limitation, component mounting system 104 is rotatable about an axis 114 between a first orientation and a second orientation that are separated by approximately 180 degrees. For another example, but not by way of limitation, component mounting system 104 is rotatable about axis 114 among a first, a second, a third, and a fourth orientation that each are separated by approximately 90 degrees.

While axis 114 is illustrated as substantially perpendicular to base 112, it should be understood that, in alternative embodiments, axis 114 is oriented in any suitable fashion with respect to base 112. For example, in one such alternative embodiment, rotor blade 70 is received in component mounting system 104 such that a longitudinal axis of rotor blade 70 is positioned substantially horizontally with respect to base 112, and component mounting system 104 enables rotor blade 70 to be rotated about axis 114 that also is substantially parallel to base 112. In other alternative embodiments, component mounting system 104 is rotatable about a plurality of axes (not shown). In still other alternative embodiments, component mounting system 104 is not rotatable to selectively present the received component of rotary machine 10 relative to image capture device 120. For example, mounting rig 102 includes an additional image capture device 120 (not shown) positioned at a second orientation relative to component mounting system 104 to facilitate obtaining images of the received component of rotary machine 10 from a plurality of angles.

In some embodiments, mounting rig 102 includes at least one datum 116 positioned to be included in images captured by image capture device 120. Each datum 116 defines a known size and orientation, and can be identified in captured images to facilitate processing of the image. For example, in the exemplary embodiment, datum 116 projects from arm 110. In alternative embodiments, datum 116 is positioned in any suitable location on mounting rig 102 that enables datum 116 to function as described herein. For example, in some embodiments, datum 116 includes a measurement gauge positioned to identify a length of a feature of rotor blade 70.

In certain embodiments, component mounting system 104 includes a plurality of interchangeable first mounting fixtures 106, and each interchangeable first mounting fixture 106 is configured to receive a different size and/or type of component of rotary machine 10. Thus, component mounting system 104 facilitates imaging and analysis of a variety of components of rotary machine 10 using a common mounting rig 102. Similarly, in some embodiments, component mounting system 104 includes a plurality of interchangeable second mounting fixtures 108, a plurality of interchangeable arms 110, and/or a plurality of other suitable interchangeable components to facilitate imaging and analysis of a variety of components of rotary machine 10 using a common mounting rig 102.

In some embodiments, mounting rig 102 also includes a positioning system 122 configured to selectively position image capture device 120 relative to base 112. In the exemplary embodiment, positioning system 122 includes a foot 124 coupled to base 112. Moreover, in the exemplary embodiment, foot 124 is translatable with respect to base 112 in a direction 126 substantially parallel to base 112. For example, but not by way of limitation, foot 124 is translatable along a track (not shown) defined in base 112. In alternative embodiments, foot 124 is fixed with respect to base 112.

In the exemplary embodiment, positioning system 122 also includes a support 128 coupled to foot 124, and image capture device 120 is coupled to support 128. Moreover, in the exemplary embodiment, image capture device 120 is translatable along support 128 in a second direction 130 substantially perpendicular to base 112. For example, but not by way of limitation, image capture device 120 is translatable along a track (not shown) defined in on support 128. In alternative embodiments, image capture device 120 is fixed with respect to support 128.

In the exemplary embodiment, translation of foot 124 with respect to base 112 and/or translation of image capture device 120 along support 128 facilitates selectively positioning image capture device 120 with respect to base 112 such that each type of received component of rotary machine 10, such as rotor blade 70, is presented at a corresponding first preselected position within a field of view 132 defined for image capture device 120. Thus, positioning system 122 and component mounting system 104 cooperate to facilitate an efficient capture of images of a plurality of received components of a given type presented in at least one common position and orientation, such that the captured images are consistently aligned for all received components of the same type. In alternative embodiments, positioning system 122 includes any suitable components that enable positioning system 122 to function as described herein. In other alternative embodiments, image capture device 120 is located externally to mounting rig 102 and positionable in any suitable fashion.

Image capture device 120 is operable to capture image data from at least one selected type of electromagnetic radiation reflected from and/or transmitted through the received component of rotary machine 10. For example, image capture device 120 is configured to capture at least one of visual spectrum, infrared, ultraviolet, and x-ray radiation. Moreover, in the exemplary embodiment, image capture device 120 is configured to selectively capture each of a plurality of types of electromagnetic radiation. For example, image capture device 120 is configured to selectively capture each of a visual spectrum image and an ultraviolet image to facilitate an enhanced analysis of the received component of rotary machine 10.

In certain embodiments, mounting rig 102 includes at least one illumination source 140. The at least one illumination source 140 is configured to provide suitable illumination to facilitate capture of a suitable image by image capture device 120. Moreover, in some embodiments, illumination source 140 includes at least one illumination source 140 configured to provide suitable illumination in each wavelength range corresponding to the type of image to be selectively captured by image capture device 120. Although illumination source 140 is illustrated as positioned to provide reflective illumination to image capture device 120, it should be understood that, in embodiments in which image capture device 120 is configured to capture electromagnetic radiation transmitted through the received component of rotary machine 10 (e.g., x-rays), illumination source 140 is suitably positionable opposite image capture device 120.

In the exemplary embodiment, illumination source 140 is coupled to a stand 142, and stand 142 is coupled to base 112. Moreover, in the exemplary embodiment, illumination source 140 is positionable with respect to base 112 in a similar fashion as described for positioning system 122. In alternative embodiments, illumination source 140 is fixed with respect to base 112. In other alternative embodiments, illumination source 140 is located externally to mounting rig 102 and positionable in any suitable fashion.

Figure 3:
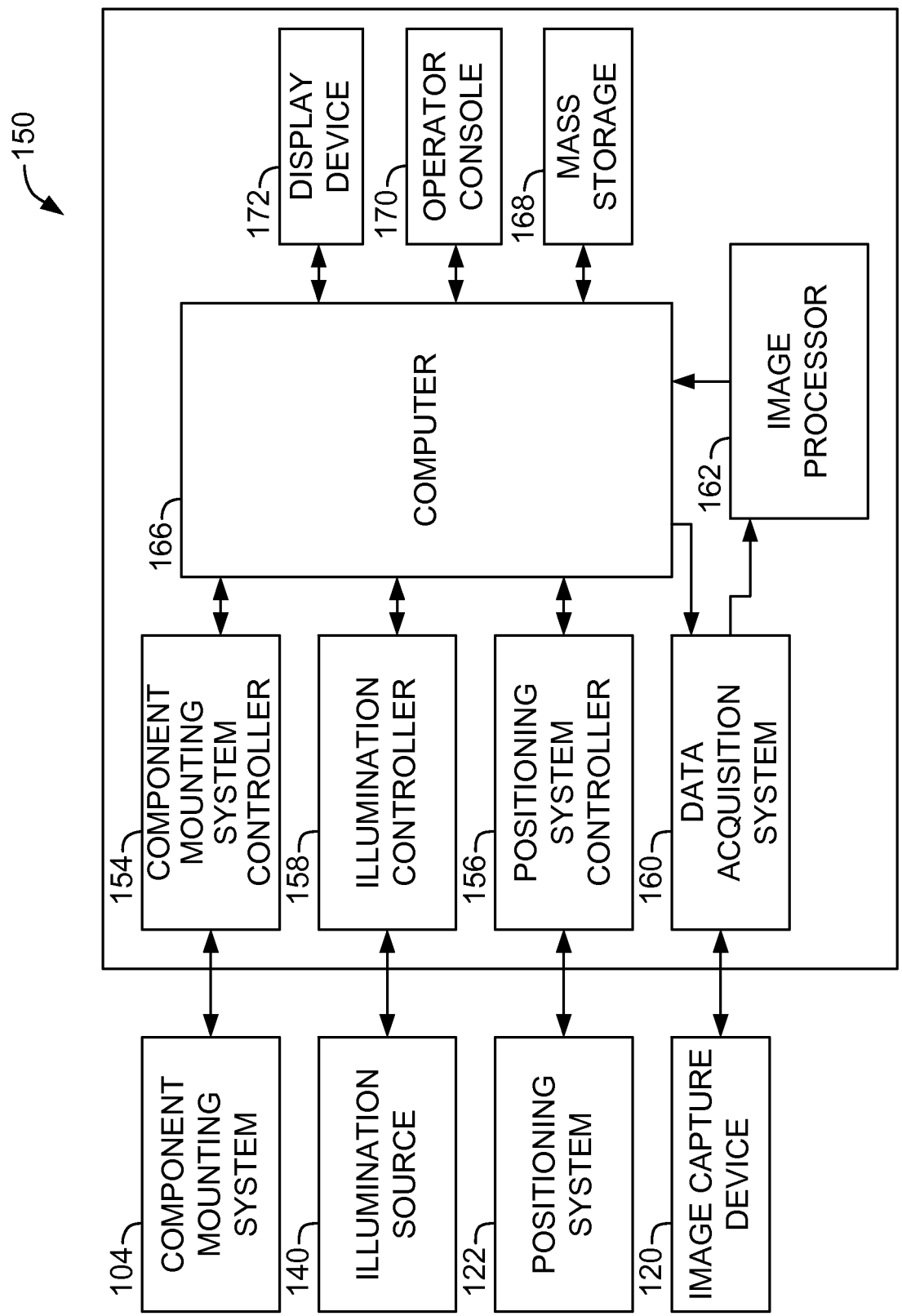
FIG. 3 is a schematic block diagram of an exemplary embodiment of a control system for use with the imaging and analysis system shown in FIG. 2.

Imaging and analysis system 100 also includes a control system 150. FIG. 3 is a schematic block diagram of an exemplary embodiment of control system 150 coupled to mounting rig 102. With reference to FIGS. 2 and 3, in the exemplary embodiment, control system 150 includes a positioning system controller 156 operatively coupled to positioning system 122. For example, positioning system controller 156 controls a position of foot 124 relative to base 112, and a position of image capture device 120 along support 128, via at least one suitable drive system. In certain embodiments, positioning system controller 156 is configured to automatically position image capture device 120 in at least one preselected position corresponding to a type of received component of rotary machine 10. For example, positioning system controller 156 is programmed to position image capture device 120 in a preselected position corresponding to a type of rotor blade 70, such that each rotor blade 70 of that type is properly and repeatably presented in field of view 132 for image capture. Additionally or alternatively, positioning system controller 156 is configured to control positioning system 122 based on operator input. In alternative embodiments, control system 150 does not include positioning system controller 156, and image capture device 120 is positionable manually.

In the exemplary embodiment, control system 150 also includes a component mounting system controller 154 operatively coupled to component mounting system 104. For example, component mounting system controller 154 controls an orientation of component mounting system 104 relative to base 112, via at least one suitable drive system. In certain embodiments, component mounting system controller 154 is configured to automatically rotate component mounting system 104 about axis 114 to at least one preselected orientation, such that the received component of rotary machine 10 is properly and repeatably presented for image capture at each preselected orientation. For example, component mounting system controller 154 is programmed to rotate component mounting system 104, and hence the received component of rotary machine 10, between a first orientation and a second orientation that are separated by approximately 180 degrees. For another example, component mounting system controller 154 is programmed to rotate component mounting system 104, and hence the received component of rotary machine 10, among a first, a second, a third, and a fourth orientation that each are separated by approximately 90 degrees. Additionally or alternatively, component mounting system controller 154 is configured to control component mounting system 104 based on operator input. In alternative embodiments, control system 150 does not include component mounting system controller 154, and component mounting system 104 is fixed or is oriented manually.

In the exemplary embodiment, control system 150 also includes an illumination controller 158 operatively coupled to illumination source 140. For example, illumination controller 158 provides power and timing signals to illumination source 140 corresponding to a timing of image capture device 120, such that a preselected power and type of illumination is provided for each image captured by image capture device 120. Additionally or alternatively, illumination controller 158 is configured to control illumination source 140 based on operator input. In alternative embodiments, control system 150 does not include illumination controller 158, and illumination source 140 is adjustable manually.

Control system 150 further includes a data acquisition system 160 operatively coupled to image capture device 120, and an image processor 162 configured to receive captured image data from data acquisition system 160. Data acquisition system 160 acquires analog and/or digital data from image capture device 120 for each captured image and converts the data to a suitable digital form for subsequent processing. Image processor 162 receives the image data from data acquisition system 160 and generates processed data associated with the received component of rotary machine 10, such as but not limited to rotor blade 70.

Control system 150 also includes a computer 166. In the exemplary embodiment, computer 166 is in communication with data acquisition system 160, image processor 162, positioning system controller 156, illumination controller 158, and component mounting system controller 154. More specifically, control signals are sent from computer 166 to controllers 156, 158, and 154 and information is received from controllers 156, 158, and 154 by computer 166. Computer 166 also provides commands and operational parameters to data acquisition system 160 and receives the processed data from image processor 162. The processed data is analyzed by computer 166, for example by comparison to reference data retrieved by computer 166 from a mass storage system 168. Additionally or alternatively, the processed data is stored by computer 166 in mass storage system 168 for subsequent retrieval and analysis. An operator interfaces with computer 166 through an operator console 170, which may include, for example, a keyboard and a graphical pointing device, and receives output, such as, for example, an analysis of a condition, such as wear and/or damage, of the received component of rotary machine 10, a list of control settings, and/or other information, on a display device 172.

Communication between the various elements of imaging and analysis system 100 is depicted in FIG. 3 by arrowhead lines, which illustrate a means for at least one of signal communication and mechanical operation, depending on the system element involved. Communication among and between the various system elements may be obtained through a hardwired or a wireless arrangement. Computer 166 may be a standalone computer or a network computer and may include instructions in a variety of computer languages for use on a variety of computer platforms and under a variety of operating systems. Other examples of computer 166 include a system having a microprocessor, microcontroller, or other equivalent processing device capable of executing commands of computer readable data or programs for executing a control algorithm. It should be understood that, although image processor 162 and computer 166 are described as separate components, in certain embodiments, image processor 162 is implemented as part of computer 166. In order to perform the prescribed functions and desired processing, as well as the computations therefor, computer 166 may include, for example and without limitation, processor(s), memory, storage, register(s), timing, interrupt(s), communication interfaces, and input/output signal interfaces, as well as combinations including at least one of the foregoing. For example, computer 166 may include input signal filtering to enable accurate sampling and conversion or acquisitions of such signals from communications interfaces.

In certain embodiments, image processor 162 is configured to generate the processed data as a filtered image. For example, image processor 162 includes a wavelength filter in which the filter wavelength is selectable to enhance identification of a selected type of wear and/or damage to the received component of rotary machine 10. For another example, image processor 162 includes an edge-detection filter to enhance identification of edges of areas of wear and/or damage, such as but not limited to cracking and/or pitting of rotor blade 70. Additionally or alternatively, image processor 162 includes any other suitable image filter that enables imaging and analysis system 100 to function as described herein. In the exemplary embodiment, because the received component of rotary machine 10 is presented in a preselected position and orientation in each of the captured images, a need of image processor 162 to identify nominal edges and/or other standard features of the received component of rotary machine 10 in order to align the image is reduced or eliminated. Thus, each filter included in image processor 162 is tuned to enhance identification of wear and/or damage, rather than identification of nominal edges and/or other standard features of the received component of rotary machine 10. Moreover, a computational burden on image processor 162 to produce the processed data is reduced.

In some embodiments, image processor 162 is configured to generate the processed data associated with the received component of rotary machine 10 as a composite image from a plurality of captured images of the received component of rotary machine 10. For example, image processor 162 is configured to combine a visual spectrum image and an ultraviolet image of the received component of rotary machine 10 in a first preselected orientation to enhance identification of a selected type of wear and/or damage to the received component of rotary machine 10. For another example, image processor 162 is configured to combine a visual spectrum image and an x-ray image of the received component of rotary machine 10 in a first preselected orientation to enhance identification of a selected type of wear and/or damage to the received component of rotary machine 10. Additionally or alternatively, image processor 162 is configured to generate the processed data as a composite image from any other suitable plurality of captured images that enables imaging and analysis system 100 to function as described herein. In the exemplary embodiment, because the received component of rotary machine 10 is presented in a preselected position and orientation in each of the captured images, a need of image processor 162 to independently align each of the plurality of captured images to be used in the composite image is reduced or eliminated. Thus, a computational burden on image processor 162 to produce the processed data is reduced.

In certain embodiments, image processor 162 is configured to generate the processed data associated with the received component of rotary machine 10 as a mathematical model of the received component of rotary machine 10. For example, image processor 162 is configured to update an ideal mathematical model, for example a model of a new and/or undamaged component, with information from at least one captured image to generate the mathematical model of the received component of rotary machine 10. Additionally or alternatively, image processor 162 is configured to generate the processed data as a mathematical model in any other suitable fashion that enables imaging and analysis system 100 to function as described herein. In the exemplary embodiment, because the received component of rotary machine 10 is presented in a preselected position and orientation in each of the captured images, a computational complexity of mapping information from the captured images to the ideal mathematical model, and thus a computational burden on image processor 162, is reduced.

It should be understood that, although each of the methods described above for generating the processed data by image processor 162 are described separately, in some embodiments image processor 162 is configured to apply a plurality of the described methods to the captured image data to generate the processed data. For example, the processed data includes both a composite image and a mathematical model of the received component of rotary machine 10.

In certain embodiments, computer 166 is configured to automatically identify a condition of the received component of rotary machine 10, such as wear and/or damage, by comparing the processed data to reference data stored in mass storage 168 for a type of the received component of rotary machine 10. Moreover, the reference data is stored in a format that enables direct comparison to the processed data by computer 166. For example, in the exemplary embodiment, the reference data is digitally stored as a processed data file, rather than as a simple image file. Thus, computer 166 determines differences between the processed data and the reference data directly to identify a condition, such as wear and/or damage, of the received component, reducing or eliminating a need for comparison to displayed reference images and/or further processing of stored reference images.

In some embodiments, the reference data includes an ideal set of data. The ideal set of data is associated with a new and/or undamaged component of the same type that is under evaluation. For example, the ideal set of data is generated from at least one image of a new and/or undamaged reference component that has been processed in a similar fashion to the captured image data of the component under evaluation.

In certain embodiments, control system 150 is configured to generate and store the ideal set of data from the new and/or undamaged component. More specifically, prior to evaluation of the received component of rotary machine 10, the new and/or undamaged reference component is received in mounting rig 102 and presented in the at least one preselected position and orientation for capture of at least image by image capture device 120. To generate the ideal set of data, the captured image data of the new and/or undamaged component is processed by image processor 162 in substantially identical fashion as that to be used for the captured image data for the component under evaluation. The ideal set of data is then stored in mass storage 168 for use in the evaluation of received components of rotary machine 10. Thus, as components of rotary machine 10 are removed from rotary machine 10 and presented for evaluation, computer 166 determines differences between the processed data and the ideal set of data directly, reducing or eliminating the need for comparison to displayed reference images and/or further processing of stored reference images.

Additionally or alternatively, the reference data includes at least one condition-type set of data. Each at least one condition-type set of data is associated with a specified condition of the received component of rotary machine 10, such as a specified type and/or location of wear and/or damage that is known and/or expected to be a risk for the received component. For example, the received component of rotary machine 10 is rotor blade 70 from a first stage of turbine section 18, and the at least one condition-type set of data includes (i) a first set of data associated with a first stage rotor blade with a previously identified surface erosion pattern, and (ii) a second set of data associated with a first stage rotor blade with cracking in a previously identified location. For example, each condition-type set of data is generated from at least one image of a reference component having the condition, where the at least one image has been processed in a similar fashion to the captured image data of the component under evaluation.

In certain embodiments, control system 150 is configured to generate and store the condition-type set of data from the reference component having the condition. More specifically, the condition-type reference component is received in mounting rig 102 and presented in the at least one preselected position and orientation for capture of at least image by image capture device 120. To generate the condition-type set of data, the captured image data of the condition-type reference component is processed by image processor 162 in a substantially identical fashion as that to be used for the captured image data for the component under evaluation. Thus, as components of rotary machine 10 are removed from rotary machine 10 and presented for evaluation, computer 166 determines differences between the processed data and the at least one condition-type set of data directly, reducing or eliminating the need for comparison to displayed reference images and/or further processing of stored reference images.

Additionally or alternatively, computer 166 is configured to identify a condition of the received component of rotary machine 10 using the processed data in any other suitable fashion that enables imaging and analysis system 100 to function as described herein. It should be noted that the capability of imaging and analysis system 100 to generate the processed data for a plurality of received components of rotary machine 10 of a given type, using processed evaluation data, ideal data, and/or condition-type reference data each derived from consistently aligned image data, facilitates consistent identification of wear and/or damage for the plurality of received components.

In some embodiments, computer 166 is configured to identify at least one of a type and a location of an identified condition, such as wear and/or damage, of the received component of rotary machine 10 based on the comparison of the processed data to at least one of the ideal set of data and the at least one condition-type set of data. For example, the type of the condition is identified by mapping differences between the processed data and the ideal set of data, and/or by mapping similarities between the processed data and the at least one condition-type set of data, to one of a plurality of listed types of wear and/or damage, such as but not limited to cracking, pitting, and erosion. For another example, the location of the identified wear and/or damage is identified by mapping a digital location of the differences between the processed data and the ideal set of data, and/or a digital location of the similarities between the processed data and the at least one condition-type set of data, to one of a plurality of listed locations of the received component of rotary machine 10, such as but not limited to an airfoil root, an airfoil midsection, an airfoil tip, an airfoil leading edge, an airfoil trailing edge, a suction side, a pressure side, a shroud plate, and a shroud rail of rotor blade 70. For another example, the type and the location of identified wear and/or damage are simultaneously identified by mapping differences between the processed data and the ideal set of data, and/or by mapping similarities between the processed data and the at least one condition-type set of data, to one of a plurality of listed combinations of type and location of wear and/or damage. For another example, a specified location of wear and/or damage is associated with each at least one condition-type set of data, and a presence of a threshold degree of similarity between the processed data and the at least one condition-type set of data results in the identification of the specified location of wear and/or damage.

Additionally or alternatively, computer 166 is configured to identify at least one of the type and the location of an identified condition of the received component of rotary machine 10 based on the processed data in any other suitable fashion that enables imaging and analysis system 100 to function as described herein. It should be noted that the capability of imaging and analysis system 100 to automatically map at least one of the type and the location of the identified condition of each received component of rotary machine 10 of a given type, based on a standardized comparison of the processed data to the reference data, facilitates consistent identification of the type and/or location of wear and/or damage for a plurality of received components.

In certain embodiments, computer 166 is configured to record at least one of the type and the location of the identified condition of the received component of rotary machine 10 in mass storage 168 and/or another suitable location, such as a parts database. Additionally or alternatively, computer 166 is configured to associate at least one of the captured image data and the processed data with the received component of rotary machine 10 in the parts database. Additionally or alternatively, computer 166 is further configured to flag the received component of rotary machine 10 as scrap in the parts database.

Figure 4:
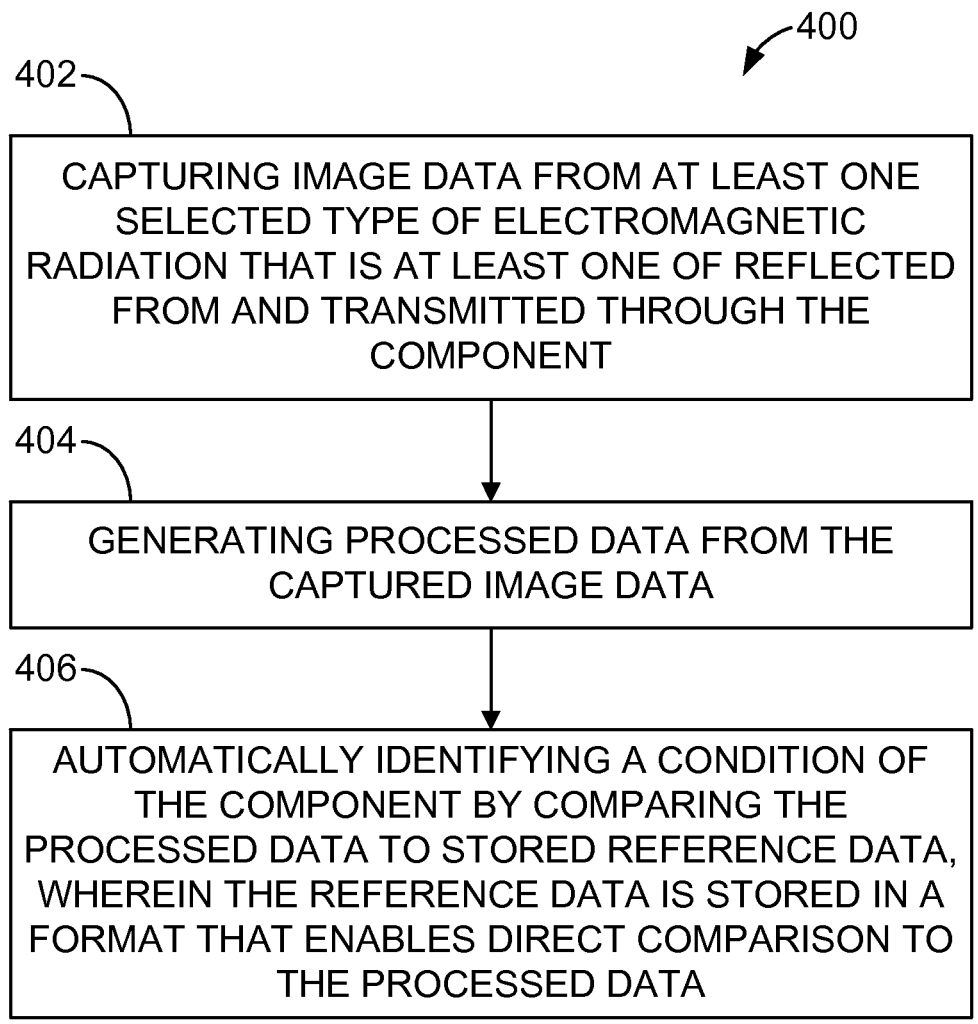
FIG. 4 is a flow diagram of an exemplary embodiment of a method of analyzing a component of a rotary machine, such as the rotary machine shown in FIG. 1.

An exemplary embodiment of a method 400 of analyzing a component of a rotary machine, such as rotor blade 70 of rotary machine 10, is illustrated in a flow diagram in FIG. 4. With reference also to FIGS. 1-3, exemplary method 400 includes capturing 402 image data from at least one selected type of electromagnetic radiation that is at least one of reflected from and transmitted through the component. Method 400 also includes generating 404 processed data from the captured image data, and automatically identifying 406 a condition of the component by comparing the processed data to stored reference data. The reference data is stored in a format that enables direct comparison to the processed data.

Exemplary embodiments of an imaging and analysis system and method for identifying a condition, such as wear and/or damage, of components of a rotary machine are described above in detail. The embodiments described herein include a computer configured to perform a direct comparison of processed data obtained from images of a component under evaluation with stored reference data to automatically identify the condition of the component. The embodiments described herein include a use of reference data associated with an ideal or condition-specific component of the type under evaluation. The embodiments described herein therefore facilitate consistent identification and categorization of wear and/or damage across similar components of similar rotary machines. Certain embodiments also include a mounting rig configured to selectively present a received component of the rotary machine in at least one preselected position and orientation relative to an image capture device. The preselected position and orientation correspond to a type of the received component, enabling an automatic alignment of a plurality of images of a plurality of components of a given type.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. An imaging and analysis system for a component of a rotary machine, said system comprising:
    an image capture device operable to capture image data from at least one selected type of electromagnetic radiation that is at least one of reflected from and transmitted through the component;
    a mounting rig comprising a rotatable component mounting system and a datum coupled to said rotatable component mounting system, wherein the rotatable component mounting system is configured to rotate such that the component is successively presented in a plurality of preselected orientations relative to the image capture device, and the datum is correspondingly presented in each of a plurality of positions associated with the plurality of preselected orientations;
    an image processor configured to generate processed data from the captured image data at each of the plurality of preselected orientations, said processed data based in part on a known size of the datum and a known one of the plurality of positions of the datum in each of the captured images; and a control system configured to automatically identify a condition of the component by comparing the processed data to stored reference data, wherein the reference data is stored in a format that enables direct comparison to the processed data.

2. The system of claim 1, wherein said rotatable component mounting system includes a plurality of interchangeable mounting fixtures, each of said interchangeable mounting fixtures is configured to receive a different size and/or type of component of the rotary machine.

3. The system of claim 1, wherein said mounting rig further comprises:
a base; and
a positioning system configured to selectively position said image capture device relative to said base.

4. The system of claim 1, wherein said image processor is configured to generate the processed data as at least one of a filtered image, a composite image from a plurality of captured images of the component, and a mathematical model of the component.

5. The system of claim 1, wherein the stored reference data includes an ideal set of data associated with a reference component that is at least one of new and undamaged.

6. The system of claim 5, wherein said control system is further configured to generate and store the ideal set of data from the reference component.

7. The system of claim 1, wherein the stored reference data includes a condition-type set of data associated with a reference component that has a specified condition.

8. The system of claim 7, wherein said control system is further configured to generate and store the condition-type set of data from the reference component.

9. A method of analyzing a component of a rotary machine, said method comprising:
receiving the component in a mounting rig that includes a rotatable component mounting system, wherein a datum is coupled to the rotatable component mounting system;
rotating the rotatable component mounting system such that the component is successively presented in a plurality of preselected orientations relative to an image capture device, wherein the datum is correspondingly presented in each of a plurality of positions associated with the plurality of preselected orientations;
capturing, at each of the plurality of preselected orientations, image data from at least one selected type of electromagnetic radiation that is at least one of reflected from and transmitted through the component;
generating processed data from the captured image data based in part on a known size of the datum and a known one of the plurality of positions of the datum in each of the captured images; and
automatically identifying a condition of the component by comparing the processed data to stored reference data, wherein the reference data is stored in a format that enables direct comparison to the processed data.

10. The method of claim 9, wherein said receiving the component further comprises receiving the component in one of a plurality of interchangeable mounting fixtures of the rotatable component mounting system, each of the interchangeable mounting fixtures is configured to receive a different size and/or type of component of the rotary machine.

11. The method of claim 9, further comprising selectively positioning the image capture device relative to a base of the mounting rig using a positioning system of the mounting rig.

12. The method of claim 9, wherein said generating processed data further comprises generating at least one of a filtered image, a composite image from a plurality of captured images of the component, and a mathematical model of the component.

13. The method of claim 9, wherein said comparing the processed data to stored reference data further comprises comparing the processed data to an ideal set of data associated with a reference component that is at least one of new and undamaged.

14. The method of claim 13, further comprising generating and storing the ideal set of data from the reference component.

15. The method of claim 9, wherein said comparing the processed data to stored reference data further comprises comparing the processed data to a condition-type set of data associated with a reference component that has a specified condition.

16. The method of claim 15, further comprising generating and storing the condition-type set of data from the reference component.

* * * * *

UNITED STATES PATENT AND TRADEMARK OFFICE
CERTIFICATE OF CORRECTION

PATENT NO. : 10,713,773 B2
APPLICATION NO. : 14/847913
DATED : July 14, 2020
INVENTOR(S) : Seely et al.

Page 1 of 1

It is certified that error appears in the above-identified patent and that said Letters Patent is hereby corrected as shown below:

On the Title Page

The first or sole Notice should read --

Subject to any disclaimer, the term of this patent is extended or adjusted under 35 U.S.C. 154(b) by 835 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*